Jan. 18, 1927.
C. H. SMITH
1,614,541
METHOD OF TREATING BALATAS AND GUTTA PERCHAS
Filed Dec. 13, 1924
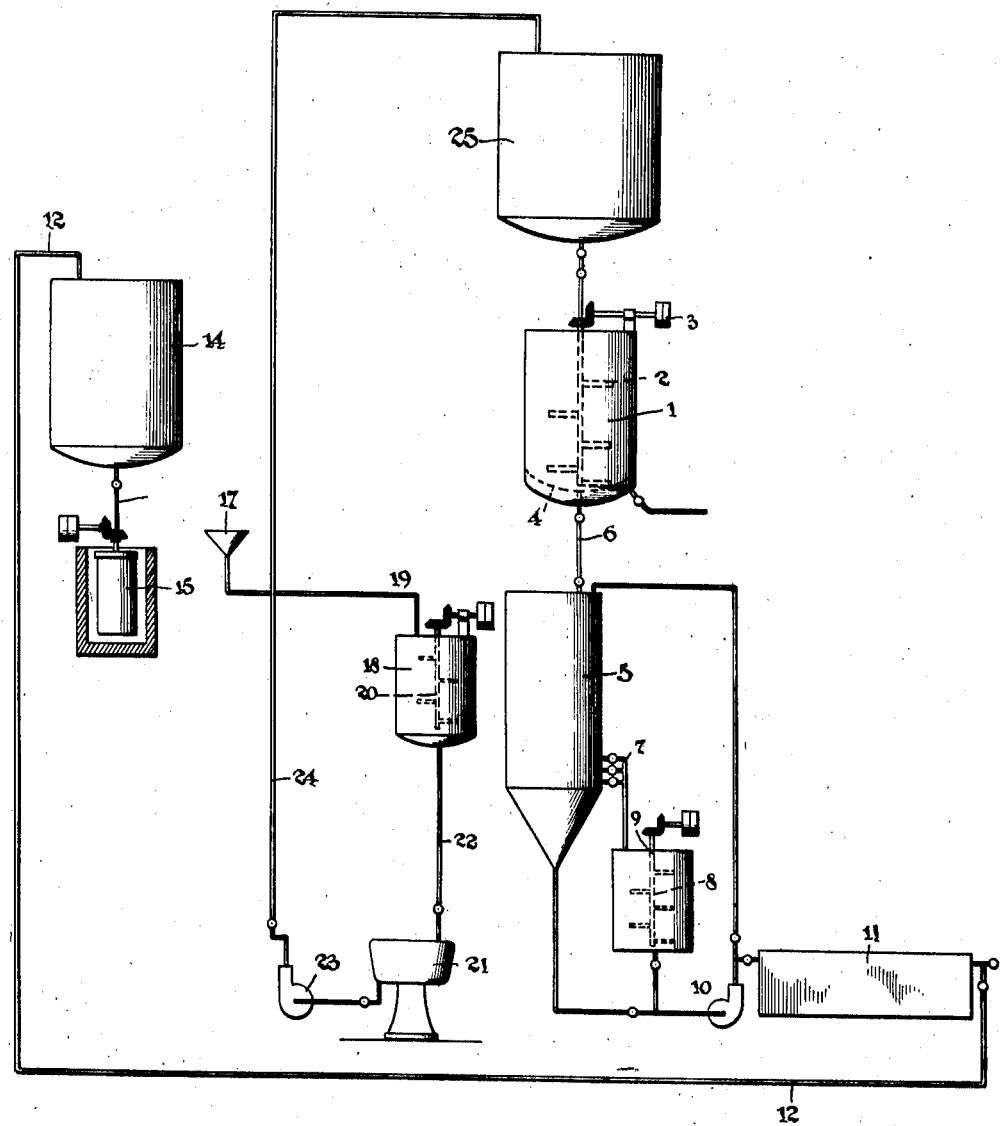
INVENTOR
Claude H. Smith
BY
ATTORNEY Patented Jan. 18, 1927.

UNITED STATES PATENT OFFICE.

CLAUDE H. SMITH, OF AKRON, OHIO, ASSIGNOR TO THE GOODYEAR TIRE & RUBBER COMPANY, OF AKRON, OHIO, A CORPORATION OF OHIO.

METHOD OF TREATING BALATAS AND GUTTA-PERCHAS.

Application filed December 13, 1924. Serial No. 755,811.

My invention relates to the manufacture of balata and gutta-percha products and it has, for its primary object, the provision of a method of purifying, decolorizing and concentrating the crude material.

Another object of my invention is to provide a method of treating low quality balatas or gutta-perchas to obtain products having a uniformly excellent quality.

The crude balata and gutta-percha that is available on the market is colored, resinous and has considerable foreign matter incorporated therein. Moreover, even when particular care is exercised in collecting and coagulating its latex, it is of variable composition and color. Many processes have been devised to make this material more uniform and desirable for its respective uses. In some cases, the material is milled in the presence of a water spray and the foreign matter is thereby removed. In other processes, a bleaching powder is incorporated during the milling process. While in still other methods, sulfur dioxide or chlorine is used to effect a decolorization. These methods of purification and decolorization react destructively on the balata and, in many instances, the color reappears. Furthermore, if the resinous material, which merely acts as a diluent for the pure gum, is not completely removed it will impart a color to the product.

In this invention, I have provided a method of removing the color, resins, and foreign matter from crude balata or gutta-percha, and thereby obviate undesirable qualities. Briefly, the process involves extracting the resins with a suitable solvent, mixing a solution of resin-free material with a decolorizing agent and recovering the decolorized solute.

The accompanying drawing is a diagrammatic view illustrating the operations involved in practicing my invention.

The crude balata, preferably in chipped form, is placed in a tank 1 where it is slowly agitated in the presence of a resin solvent by some suitable device, such for example as indicated at 2. The agitating device is driven by means of a pulley arrangement 3 from some source of power, not shown. The de-resined material is then dissolved in a pure solvent, with the aid of heat supplied from a steam jacket 4, which partially surrounds the tank 1.

A decolorizing agent is added to this solution, while being agitated and the suspension, thus formed, is allowed to settle. I have provided a special settling tank 5 for this step which is connected to the dissolving tank 1 by the conduit 6. Tap pipes 7 connected at different levels to the settling tank 5 are used to draw off supernatant liquid, which results from the settling process. These conduct the liquid to a storage tank 8, prior to its filtration. The tank is provided with an agitating device 9 which serves to suspend a filter-aid employed to facilitate the filtration. The suspension is conducted to a pump 10 which forces it under pressure through a filter press 11. The filtrate is then conducted through a suitable conduit 12 to a storage tank 14.

When gasolene is used as the gum solvent, the decolorized product may readily be recovered by merely chilling the clear bleached filtrate. This is readily accomplished by means of any suitable cooling device whether continuous or intermittent in character. I have found a freezer mechanism, such as indicated at 15, conveniently applicable. The filtrate is fed from the storage tank 14 through a pipe or hose connection 16 to the freezer device. The chilled suspended product is poured into a funnel arrangement 17 and conducted to a storage tank 18 through a conduit 19. The storage tank 18 is provided with a stirring device 20 in order to maintain the suspension.

The two phases of the mixture may be separated by any convenient means. I have provided a centrifuge arrangement 21 which is fed from the suspension storage through a pipe 22. A pump 23 is provided to force the solvent through suitable pipe connections 24 to a storage container 25. Finally the solid phase product is dried, preferably in a vacuum drier not shown.

A large number of solvents are suitable for extracting the resins, among which are acetone, chloroform, any volatile hydro-carbon, et al. I prefer to use a high test gasolene, because the same solvent employed to extract the resin may be used in dissolving the resin-free balata, by merely controlling its temperature.

While it is true, that the resins may be extracted more rapidly and more completely with hot acetone, this involves the use of at least two more-expensive solvents. Gasolene has an added advantage, in that the gum is practically insoluble therein at a low temperature. This obviates the necessity of adding a precipitating agent to the solvent, which in turn must be separated before it is again available for use in the process. A counter-current extraction of the resins is advantageously applicable, after which the solvent may, of course, be freed of its resin by any suitable means, such as distillation or precipitation.

Any decolorizing agent may be utilized. I have found fuller's earth very satisfactory because it is white and filters readily, whereas bone char leaves small particles of black material in solution, which may not be readily removed. Furthermore, due to its chemical inertness, fuller's earth has a decided advantage over bleaching powder, sulfur-dioxide or chlorine and it may be revivified and utilized any number of times by merely washing it with a suitable solvent or by heating in the presence of air. The quantity of fuller's earth necessary for satisfactory results varies with the quality of the raw material, generally one pound of decolorizer is sufficient to treat three pounds of crude stock.

The settling process is not necessary in practicing my invention. However, I prefer to add this step because it reduces the necessary capacity of the filter press. Likewise, the addition of a filter-aid to the supernatant liquid is optional at the discretion of the operator. The added step is advisable, because the filter-aid adsorbs the insoluble material which would otherwise form a thin impervious coat on the filter cloths, and thereby retard the filtration.

It is also to be understood, that the invention is not limited to any single means of agitation, and, although I have suggested the use of mechanical stirrers, other suitable means may be used in practicing my invention, as, for example, compressed air.

In the description and claims the word "gum" has been used to designate the rubber-like product which results after the resins have been extracted from the crude balata or gutta-percha.

Although I have outlined but one method of applying the principles of my invention, it is obvious to anyone skilled in the art that many apparently widely different procedures may be followed without departing from the spirit of the invention and I desire, therefore, that it shall be limited only in accordance with the appended claims.

What I claim is:

1. A process of purifying resin containing balata or gutta-percha that comprises extracting the resins with a solvent progressively lower in resin content, dissolving the de-resined material in fresh solvent, intimately mixing the resultant solution with an inert decolorizing agent, removing the agent and finally precipitating the balata product.

2. A process of purifying resin containing balata or gutta-percha that comprises extracting the resins with a solvent progressively lower in resin content, dissolving the de-resined material in a fresh solvent, decolorizing the resultant solution by intimately mixing fuller's earth therewith, filtering the suspension, chilling the decolorized solution thereby precipitating the product, and drying the product.

3. A process of purifying balata or gutta-percha that comprises extracting the resins, intimately mixing powdered fuller's earth with a solution of the resin-free balata, removing the suspended matter, chilling the solution, to precipitate the balata, centrifuging the precipitated product and drying it in a partial vacuum.

In witness whereof, I have hereunto signed my name.

CLAUDE H. SMITH.